Oct. 28, 1947.  R. S. CURRY, JR  2,429,612
GYROSCOPE
Filed May 10, 1943  2 Sheets-Sheet 1
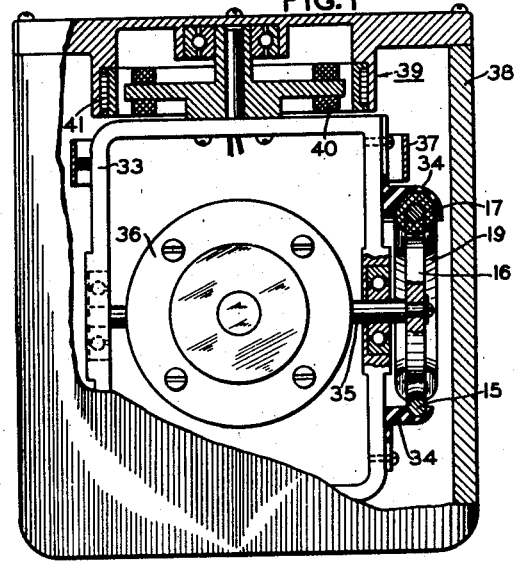
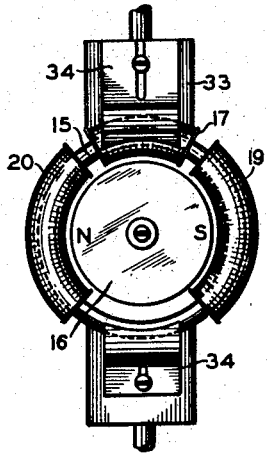
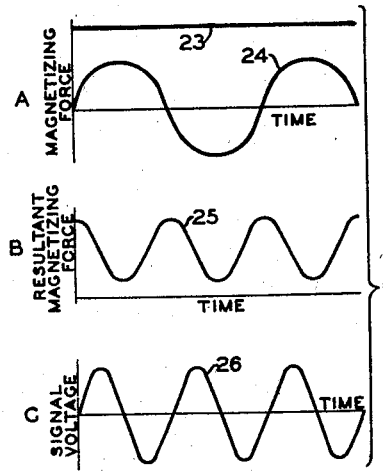
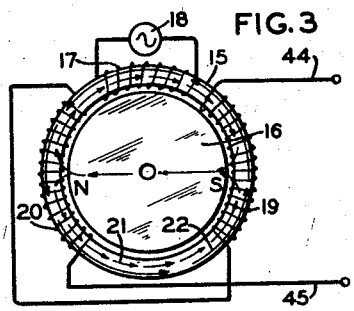
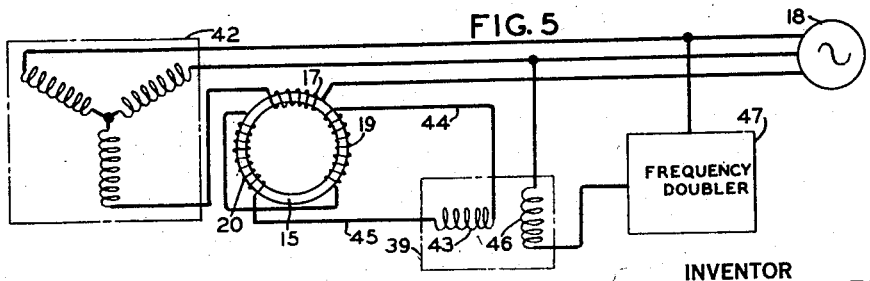
INVENTOR
ROBERT S. CURRY, JR.
BY
Herbert H. Thompson
HIS ATTORNEY Oct. 28, 1947.  R. S. CURRY, JR  2,429,612
GYROSCOPE
Filed May 10, 1943  2 Sheets-Sheet 2

INVENTOR
ROBERT S. CURRY, JR.
BY
Herbert H. Thompson
HIS ATTORNEY

Patented Oct. 28, 1947

2,429,612

UNITED STATES PATENT OFFICE 2,429,612

GYROSCOPE

Robert S. Curry, Jr., Baldwin, N. Y., assignor to Sperry Gyroscope Company, Inc., a corporation of New York Application May 10, 1943, Serial No. 486,461

4 Claims. (Cl. 74—5)

This invention relates to gyroscope instruments and particularly concerns a generator or pick-off that is situated to detect angular displacement between two relatively movable parts of such an instrument.

One of the objects of the invention is to provide a phase sensitive signal generator or pick-off that is effective to control the leveling of the rotor bearing case of a directional gyro.

Another object of the invention is to provide a generator or pick-off of this character that is effective as an erecting torque controller of a gyro vertical type of gyroscopic instrument.

A generator or pick-off constructed in accordance with the invention has two relatively movable parts, one of which is a symmetrical frame of magnetically permeable material having an exciting and an output winding thereon, and the other of which is a permanent magnet.

Other objects, features and structural details of the invention will be apparent from the following description when read in relation to the accompanying drawings, wherein Fig. 1 is a side elevation of a directional gyro with the casing of the instrument broken away, showing the generator employed as a leveling torque controller.

Fig. 2 is a detail front elevation of the generator illustrated in Fig. 1.

Fig. 3 is a schematic view showing the electrical parts of the controller in detail.

Fig. 4 illustrates a number of curves employed in explaining the operation of the generator.

Fig. 5 is a circuit diagram of the electrical connections of the parts of the directional gyro shown in Fig. 1 and including the novel control means.

Figure 6:
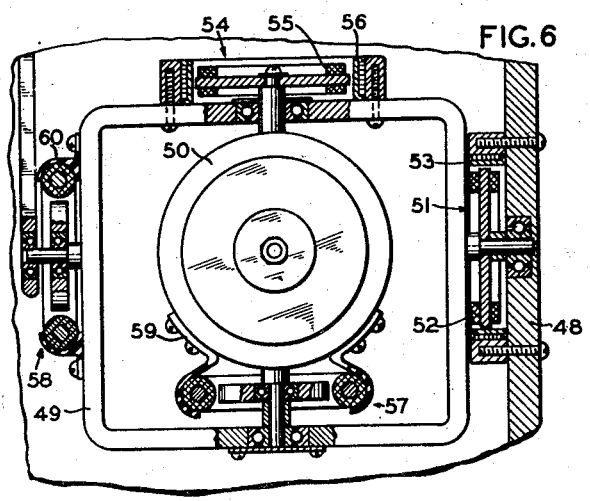
Fig. 6 is a plan view of a gyro vertical instrument showing the generators incorporated therein.

With particular reference to Fig. 3, the novel signal generator is shown to include a frame 15 of magnetically permeable material. Frame 15 is symmetrical in shape and, as shown, is constructed in the form of a toroidal or annular core that is round in cross-section. The core could obviously be constructed of a number of flat laminations if so desired. The other part of the generator is provided by a permanent magnet 16 that is mounted for movement relative to the frame at the axis of symmetry of the frame. In Fig. 3, the magnet 16 is disc-shaped and is centrally positioned within the opening of the symmetrical frame or core 15. An exciting winding 17 is employed on the core which, in this instance, is supplied with alternating current electrical energy from a suitable source 18. The output of the generator is provided by windings 19 and 20 which are also mounted on the core. Windings 17, 19 and 20 may take the form of arcuately shaped coils that are positioned in the manner illustrated in Fig. 2. The coils are preferably formed by windings made directly on the frame.

The magnet 16 functions to control the phase sense of the output signal. In the relation of the parts shown in Fig. 3, with the polar ends of the magnet 16 horizontal, the generator has no output. In explanation of the operation of the generator, reference is also made to Fig. 4. The generator is influenced by two independent magnetizing forces, one of which is the constant magnetizing force of the permanent magnet and the other of which is the alternating magnetizing force caused by the alternating current flowing through the exciting winding 17. The field flux of the magnet 16 flows in the frame or core 15 in two equally divided parts which travel in semi-circular paths, as indicated by the arrows 21 in Fig. 3. The field flux caused by the exciting winding 17 flows through the core first in a clockwise direction and then in a counterclockwise direction as viewed in this figure. An instantaneous position of this field is indicated by the arrows 22.

The constant magnetizing force is represented graphically in Fig. 4A by the straight line 23 and the similar force due to the alternating current excited coil or winding 17 is represented by the sine curve 24. At a point of flux saturation, the reluctance of the core to the field flux of the permanent magnet is increased. The resultant cyclic pulsation of the lines of flux from the permanent magnet 16 in the signal generator core is shown by the curve 25 in Fig. 4B. The peaks of this curve occur along the time axis at a point where the alternating magnetomotive force of the exciting winding is zero so that the resultant pulsations have double the input exciting frequency. The change in flux in the frame induces a voltage signal in the output windings or coils 19 and 20 of the character indicated by the sine curve 26 in Fig. 4C. Expressed in other terms, it may be stated that the frequency of the generated output signal corresponds to the number of pulses or beats produced on the field of magnet 16 due to the periodic saturation of the frame by the pulsating or alternating current energy supplied the generator by the source 18. Any induced voltages in the output windings having the frequency of the source 18 are bucked out of the signal output of the generator by connecting the windings in opposition.

The parts of the generator are mounted for angular movement with respect to one another about the axis of symmetry of the frame 15, the magnet preferably being the movable unit. When positioned as shown in Fig. 3, equal parts of the flux of the magnet flow in opposite directions in equal sections of the respective windings 19 and 20 so that there is no output. When movement between the parts of the generator occurs, this balanced condition is no longer effective as the half sections of the respective windings 19 and 20 under influence of the changing flux field are no longer equal. Maximum output of the generator occurs when the poles of the magnet 16 are situated in a vertical position when viewed in Fig. 3. The output signal is phase sensitive depending on the direction in which displacement of the parts from a zero output position occurs. The output voltages of the respective windings 19 and 20 are additive when the generator is effective.

Figure 8:
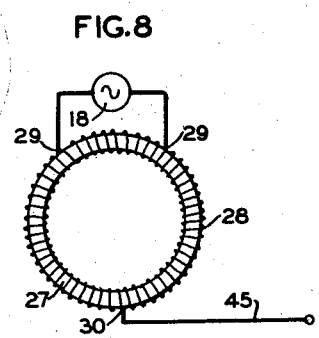
Fig. 8 is a view similar to Fig. 3 showing a modified form of generator.

With reference to Fig. 8, a modified form of the frame part of the generator is shown comprising a "Gramme" ring 27 whose winding 28 has an input pair of tapped connections 29 and output tapped connection 30. The upper portion of the winding between taps 29 provides the equivalent of exciting coil or winding 17 while the two halves of the winding between output tap 30 and either one of the taps 29 produce the phase sensitive voltage output of the generator. The permanent magnet for the frame is not shown in this view, the same being similar to that utilized in the form of the invention described and shown in detail in Fig. 3.

Figure 9:
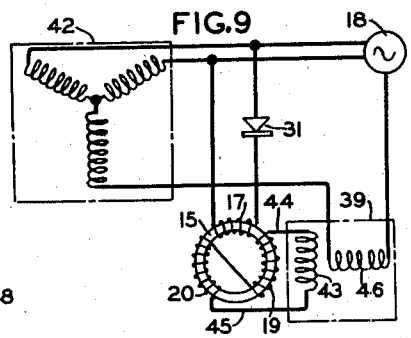
Fig. 9 is a circuit diagram similar to Fig. 5 showing a modified arrangement thereof.

The exciting winding 17 may be energized as indicated in Fig. 9 through a series circuit including a rectifier 31 which blocks half the energy from source 18 from flowing in the exciting winding. In the signal generator the output has the same signal frequency as the frequency of the source 18 because of the fact that the unidirectional exciting pulsations of the frame are one-half the frequency of the source. In accordance with the above, it is apparent that the core can be excited with unidirectional energy of a given frequency.

The parts of the generator are mounted on angularly displaceable members which may be of the form shown in Figs. 1 and 2 of the drawings. The member holding the core 15 is the vertical ring 33 of a directional gyro, the frame being mounted thereon by means of a bracket 34. Magnet 16 is fixed in position on the end of a trunnion 35 by which the rotor bearing case 36 of the gyro instrument is mounted on the ring 33. The other of the displaceable members may therefore be considered to be the trunnion or the rotor case of the gyro instrument. From the above, the generator employed functions as a controller that is responsive to angular displacement of the rotor case when the same tilts from a normal level position to produce a phase sensitive output signal, depending on the direction of tilt. The generator detects tilt of the case 36 relative to ring 33, the same operating as a signal producing pickoff that is free of coersive influence or reaction on the ring with relative tilt between the gyroscopic parts from a normal condition. This result is primarily due to the fact that magnet 16 of the generator is balanced gravitationally about the axis of the case 36 defined by trunnions 35. With this type of controller, there is also no electrical coersive reaction on the ring of the instrument when the parts are displaced from the normal condition. The conventional type of directional gyro illustrated in Figs. 1 and 2, includes a compass card 37, an outer casing 38 in which the ring 33 is mounted to pivot about a vertical axis, and a torque motor generally indicated at 39 by which a torque is exerted about the axis of the ring to restore the rotor case to a normal position. Other electrically responsive means may be controlled by the output of the controller to produce the desired torque about the axis of the ring. The specific motor shown to perform this function is a two-phase induction motor of the squirrel cage type whose wound stator 40 is fixed to the ring 33 and whose inductive rotor 41 is fixed in an inwardly extending recess in the top or cover position of the casing 38.

In the circuit arrangement of the parts shown in Fig. 5, alternating current source 18 is shown as directly connected to a three-phase gyro rotor spinning motor generally indicated at 42. This motor is contained within the rotor case 36 shown in Fig. 1 and does not appear in detail in the drawing, the same being of conventional form and providing no part of the present invention. Exciting winding 17 of the controller is energized by being series connected in one of the leads connecting source 18 and the motor 42. Torque motor 39 has one of its stator windings as indicated at 43 supplied with energy by way of the output leads 44 and 45 of the controller. Leads 44 and 45 provide means carried by the ring of the gyroscopic instrument for connecting the output winding of the controller and the torque motor. The other winding 46 of the torque motor 39 is continuously energized from the source 18 through a suitable frequency doubler 47 so that the phase and frequencies of the controlling energy for the motor are matched. In operation, the generator functions as a controller for the motor 39 that has no output when the case 36 is in a level position. Upon tilt of the case from such a position, the magnet 16 is moved relative to the core 15 of the generator to produce a double frequency, phase sensitive signal voltage that is fed to the control winding 43. Motor 39 is consequently energized to produce a torque about the axis of the vertical ring in a direction that restores the universally mounted rotor case to a normal position about its tilt axis. The controller is mounted in this instance to detect displacement about the tilt axis of the rotor case of a directional gyro instrument, the axis of symmetry of the frame of the generator being coincident with the tilt axis of the case.

In the control circuit shown in Fig. 9, the continuously energized winding 46 of the torque motor 39 is shown as series connected in one of the leads by which energy is supplied to the gyro motor 42 from source 18. This is possible in view of the fact that the output of this particular generator has the same frequency as the source due to the previously described manner of exciting the same.

Figure 7:
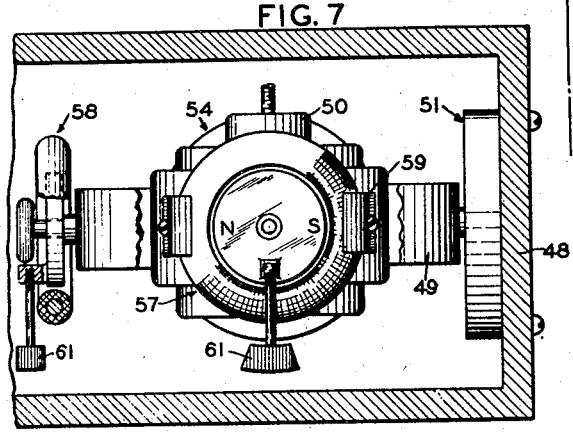
Fig. 7 is a side elevation view of the instrument shown in Fig. 6.
Figure 10:
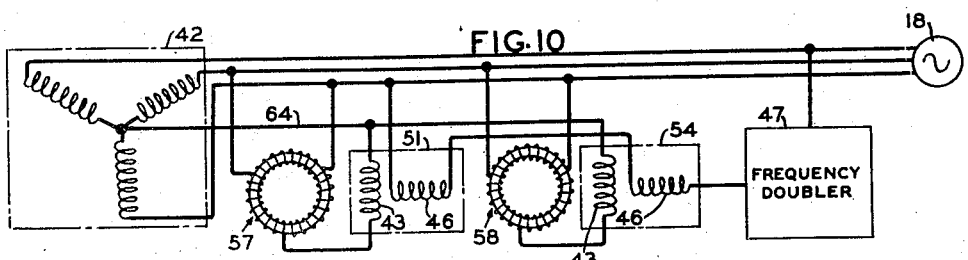
Fig. 10 is a circuit diagram showing the arrangement of the electrical parts of the gyro vertical instrument with the generators employed therein included.

Adaptation of the generator as the controller for an electrical torque exerting means operable to erect the rotor case of a gyro vertical type of instrument is particularly shown in Figs. 6, 7 and 10. A conventional gyro vertical is employed in this connection that includes an outer casing 48, a gimbal ring 49 pivotally mounted with reference to the casing 48 about the major or roll axis of the instrument. A gyro rotor case 50 having a gyro rotor (not shown) therein that spins on a normally vertical axis is pivotally mounted on the gimbal ring 49. The axis of the case 50 is perpendicular to the axis of the ring, the same defining the pitch or minor axis of the instrument. The mounting provided the gyro rotor case supports the same for universal movement with respect to the casing 48. The torque exerting means shown are motors of the character indicated in Fig. 1. In this instance, torque motor 51 at the major axis of the instrument has its stator 52 fixed to the ring 49 and its rotor 53 secured to the casing 48. The torque motor 54 at the minor axis of the instrument has its stator 55 mounted on an extending portion of a trunnion that is fixed to the rotor case 50 and its rotor 56 fixed in position on the ring 49.

Two controllers are employed in the present instance, the same being generally indicated at 57 and 58. Controller 57 is mounted to detect tilt of the case about the pitch axis of the instrument, and is effective to control torque motor 51. Likewise, controller 58 is effective to control torque motor 54 responsive to tilt about the roll axis of the instrument. The frame of controller 57 is fixed to the rotor case 50 by means of a bracket 59. Similarly, bracket 60 positions the frame of controller 58 on the ring 49. The permanent magnet parts of the respective controllers are situated at the roll and pitch axes of the instrument. A vertical reference member such as a pendulum 61 may be attached to each of these magnet parts of the respective controllers. In this instance, the magnets provide a vertical reference and the frames move relatively to the same to produce an output signal. The controllers operate in the manner previously described in connection with the directional gyro instrument.

In the circuit arrangement shown, the continuously energized windings 46 of the torque motors are series connected and are fed from source 18 through the frequency doubler 47. The separate exciting windings of the controllers 57 and 58 are arranged in parallel relation, being independently energized from source 18 by way of the leads supplying energy to the gyro rotor spinning motor 42. Control windings 43 of the respective torque motors 51 and 54 are situated in parallel relation by means of common lead 64, one end of which may be connected to a mid-tap position on the stator windings of the gyro rotor spinning motor 42.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A directional gyro including, a casing, a vertical ring pivotally mounted in said casing, a rotor bearing case pivotally mounted on the ring on an axis normal to the axis of the ring, a motor for exerting a torque about the axis of the ring having a stator fixed to the ring, a signal voltage generator responsive to tilt of the case relative to the ring about the axis of the case free of coersive reaction comprising a symmetrical frame of magnetically permeable material fixedly mounted on the ring with the axis of symmetry thereof coincident with the tilt axis of the case, a permanent magnet mounted for movement with the case about its tilt axis whose field flux normally flows in the frame in two substantially equally divided parts, means for exciting said frame with a periodically varying flux, and a phase sensitive winding in said frame connected to feed its output to the stator of said torque motor.

2. A gyro vertical including, a casing, a gimbal ring pivotally mounted in the casing, a rotor bearing case pivotally mounted on the ring on an axis normal to the axis of the ring, a motor for exerting a torque about the axis of the ring, a signal voltage generator responsive to tilt of the case relative to the ring free of coersive reaction comprising a symmetrical frame of magnetically permeable material mounted on the case with the axis of symmetry thereof coincident with the tilt axis of the case, a permanent magnet movable relative to said frame whose field flux normally flows in the frame in two substantially equally divided parts, a vertical reference-defining member for positioning said permanent magnet, means for exciting said frame with a periodically varying flux, and a phase sensitive winding on said frame connected to feed its output to operate said torque motor.

3. A gyro vertical including, a casing, a gimbal ring pivotally mounted in the casing, a rotor bearing case pivotally mounted on the ring on an axis normal to the axis of the ring, a motor for exerting a torque about the axis of the case, a signal voltage generator responsive to tilt of the ring relative to the casing free of coersive reaction comprising a symmetrical frame of magnetically permeable material mounted on the ring with the axis of symmetry thereof coincident with the tilt axis of the ring, a permanent magnet movable relative to said frame whose field flux normally flows in the frame in two substantially equally divided parts, a vertical reference-defining member for positioning said permanent magnet, means for exciting said frame with a periodically varying flux, and a phase sensitive winding on said frame connected to feed its output to operate said torque motor.

4. A gyroscopic instrument including, in combination, a casing, a gimbal ring pivotally mounted in said casing, a rotor bearing case pivotally mounted on said ring on an axis normal to the axis of the ring, a motor for exerting a torque about the axis of said ring, a signal voltage generator detecting tilt about the axis of the rotor case and free of coercive influence on the ring comprising a symmetrical frame of magnetically permeable material fixedly mounted on said ring with its axis of symmetry coincident with the axis of the case, a permanent magnet fixedly mounted to said case whose field flux normally flows in said frame in two substantially equally divided parts, means for exciting said frame with periodically varying flux, a phase sensitive output winding on said frame, and means carried by said ring connecting said winding and said torque motor.

ROBERT S. CURRY, JR.

REFERENCES CITED

The following references are of record in the file of this patent:

UNITED STATES PATENTS

| Number | Name | Date |
|---|---|---|
| 2,342,637 | Bechberger | Feb. 29, 1944 |
| 2,137,974 | Fischel | Nov. 22, 1938 |
| 2,367,465 | Kunzer | Jan. 16, 1945 |
| 1,228,061 | Schuler | May 29, 1917 |
| 1,136,566 | Usener | Apr. 20, 1915 |
| 2,220,055 | Fischel et al. | Oct. 29, 1940 |
| 2,053,154 | La Pierre | Sept. 1, 1926 |
| 2,158,500 | Guerra | May 16, 1939 |
| 2,323,566 | Peterson | July 6, 1943 |
| 2,269,602 | Reichel | Jan. 13, 1942 |

FOREIGN PATENTS

| Number | Country | Date |
|---|---|---|
| 180,413 | Great Britain | May 18, 1944 |